United States Patent
Chang et al.

(10) Patent No.: US 11,210,444 B1
(45) Date of Patent: Dec. 28, 2021

(54) TIMING ASSISTANT FOR DYNAMIC VOLTAGE DROP IMPACT ON SETUP/HOLD CONSTRAINTS

(71) Applicant: Ansys, Inc., Canonsburg, PA (US)

(72) Inventors: Norman Chang, Fremont, CA (US); Hao Zhuang, San Jose, CA (US); Ganesh Tsavatapalli, Bangalore (IN); Joao Geada, Chelmsford, MA (US); Sankar Ramachandran, Bangalore (IN); Rahul Rajan, Kerala (IN); Ying-Shiun Li, Pleasanton, CA (US); Yaowei Jia, San Jose, CA (US); Mathew Joseph Kaipanatu, Kerala (IN); Suresh Kumar Mantena, Pradesh (IN)

(73) Assignee: Ansys, Inc., Canonsburg, PA (US)

( * ) Notice: Subject to any disclaimer, the term of this patent is extended or adjusted under 35 U.S.C. 154(b) by 81 days.

(21) Appl. No.: 16/448,495

(22) Filed: Jun. 21, 2019

Related U.S. Application Data

(60) Provisional application No. 62/688,580, filed on Jun. 22, 2018.

(51) Int. Cl.
  *G06F 30/3312* (2020.01)
  *G06F 30/367* (2020.01)
(52) U.S. Cl.
  CPC ........ *G06F 30/3312* (2020.01); *G06F 30/367* (2020.01)
(58) Field of Classification Search
  CPC ........................... G06F 30/3312; G06F 30/367
  USPC ................................................. 703/14; 716/6
  See application file for complete search history.

(56) References Cited

U.S. PATENT DOCUMENTS

| | | | | |
|---|---|---|---|---|
| 5,452,225 A | * | 9/1995 | Hammer | G06F 30/33 703/19 |
| 5,559,715 A | * | 9/1996 | Misheloff | G06F 30/33 703/19 |
| 5,655,109 A | * | 8/1997 | Hamid | G06F 30/367 716/103 |
| 6,629,299 B1 | * | 9/2003 | Iwanishi | G06F 30/33 716/104 |
| 6,820,048 B1 | * | 11/2004 | Bhutani | G06F 30/33 703/15 |
| 7,152,217 B1 | * | 12/2006 | Srinivasan | G06F 30/39 716/113 |
| 7,191,419 B2 | * | 3/2007 | Soreff | G06F 30/3312 716/113 |

(Continued)

OTHER PUBLICATIONS

Viswanathan et al. "ITOP: Integrating Timing Optimization within Placement", ISPD '10, Mar. 2010, ACM 8 pages. (Year: 2010).*

(Continued)

*Primary Examiner* — Juan C Ochoa
(74) *Attorney, Agent, or Firm* — Jones Day

(57) ABSTRACT

Example systems and methods are disclosed for performing a timing analysis on a circuit design. A plurality of switching scenarios are identified for the circuit design. One or more predictive models are applied to predict a subset of the plurality of switching scenarios that are likely to cause timing paths with critical timing problems. A dynamic voltage analysis is performed on timing paths based on the subset of switching scenarios. The one or more predictive models are applied to predict a set of critical timing paths based on the subset of switching scenarios that are likely to cause critical timing problems, the one or more predictive models taking into account the dynamic voltage analysis. A timing analysis is the performed on the set of critical timing paths.

26 Claims, 13 Drawing Sheets

(56) References Cited

U.S. PATENT DOCUMENTS

| | | | | |
|---|---|---|---|---|
| 8,788,995 | B1* | 7/2014 | Kumar | G06F 30/398 716/113 |
| 9,245,071 | B2* | 1/2016 | Katz | G06F 30/3312 |
| 9,646,122 | B2* | 5/2017 | Foreman | G06F 30/3312 |
| 9,875,333 | B1* | 1/2018 | Verma | G06F 30/3312 |
| 2003/0204817 | A1* | 10/2003 | Kashyap | G06F 30/367 716/102 |
| 2005/0021238 | A1* | 1/2005 | McGuffin | G06N 3/126 702/20 |
| 2012/0159276 | A1* | 6/2012 | Dian | G01R 31/3016 714/734 |
| 2017/0255732 | A1* | 9/2017 | Milor | G11C 29/50004 |
| 2018/0121585 | A1* | 5/2018 | Cherupalli | G06F 30/3312 |

OTHER PUBLICATIONS

Wang et al. "An Efficient Method to Identify Critical Gates under Circuit Aging", 2007, IEEE, pp. 735-740. (Year: 2007).*

Breiman, Leo; Random Forests; Machine Learning, 45; pp. 5-32; 2001.

Breiman, Leo; Stacked Regressions; Machine Learning, 24; pp. 49-64; 1996.

Burges, Christopher; From RankNet to LambdaRank to LambdaMART: An Overview; Microsoft Research Technical Report MSR-TR-2010-82; 2010.

Chen, Tianqi; Guestrin, Carlos; XGBoost: A Scalable Tree Boosting System; Proceedings of the 22nd ACM SIGKDD International Conference on Knowledge Discovery and Data Mining; San Francisco, CA; pp. 785-794; Aug. 2016.

Herbrich, Ralf; Graepel, Thore; Obermayer, Klaus; Support Vector Learning for Ordinal Regression; Proceedings of the 9th International Conference on Artificial Neural Networks, ICANN; Edinburgh, UK; Sep. 1999.

Lecun, Yann, Bengio, Yoshua, Hinton, Geoffrey; Deep Learning; Nature, 521; p. 436-444; May 2015.

* cited by examiner

TIMING ASSISTANT FOR DYNAMIC VOLTAGE DROP IMPACT ON SETUP/HOLD CONSTRAINTS

This application claims priority to U.S. Provisional Application No. 62/688,580 filed on Jun. 22, 2018, titled "Timing Assistant for Dynamic Voltage Drop Impact on Setup/Hold Constraints," the entirety of which is herein incorporated by reference.

TECHNICAL FIELD

The technology described herein relates generally to computer-aided design (CAD) tools and more particularly to systems and methods for performing a timing analysis for an integrated circuit that accounts for dynamic voltage drop.

BACKGROUND

Large integrated circuits, such as System-on-a-Chip (SoC) designs, often suffer from a reduced operational frequency due to various timing constraints. This reduction in operating frequency is often caused by the impact of dynamic voltage drop on setup timing violations (referred to as maximum timing push-off.)

SUMMARY

Example systems and methods are disclosed for performing a timing analysis on a circuit design. A plurality of switching scenarios are identified for the circuit design. One or more predictive models are applied to predict a subset of the plurality of switching scenarios that are likely to cause timing paths with critical timing problems. A dynamic voltage analysis is performed on timing paths based on the subset of switching scenarios. The one or more predictive models are applied to predict a set of critical timing paths based on the subset of switching scenarios that are likely to cause critical timing problems, the one or more predictive models taking into account the dynamic voltage analysis. A timing analysis is the performed on the set of critical timing paths.

DETAILED DESCRIPTION

Timing analysis tools, such as static timing analysis (STA) including graph base analysis and path base analysis and SPICE-based simulation tools (such as Path-FX tool sold by Ansys, Inc. of Canonsburg, Pa., or HPSPICE tool sold by Synopsis), are commonly used to evaluate timing constraints in an integrated circuit design along timing paths of the design. A timing path is a path between a start point (e.g., an input port or clock pin of a sequential element) and an end point (e.g., an output port or data pin (D-pin) of a sequential element) of a design. However, a modern SoC design may include millions/billions of timing paths, making it infeasible (if not impossible) to run a SPICE-based timing analysis on all timing paths. Therefore, in order to reduce timing constraints, such as those caused by dynamic voltage drop, an SoC designer may attempt to identify a smaller set of critical timing paths, for example using static timing analysis, and perform a SPICE-based timing analysis on only the identified critical timing paths. It is often difficult or impossible, however, to identify the best subset of critical timing paths in a large SoC design. Embodiments of the systems and methods disclosed herein therefore provide a software tool (referred to as a timing assistant) that may be used to predict a subset of the most critical timing paths on which to perform a full (e.g., SPICE-based) timing analysis.

Figure 1:
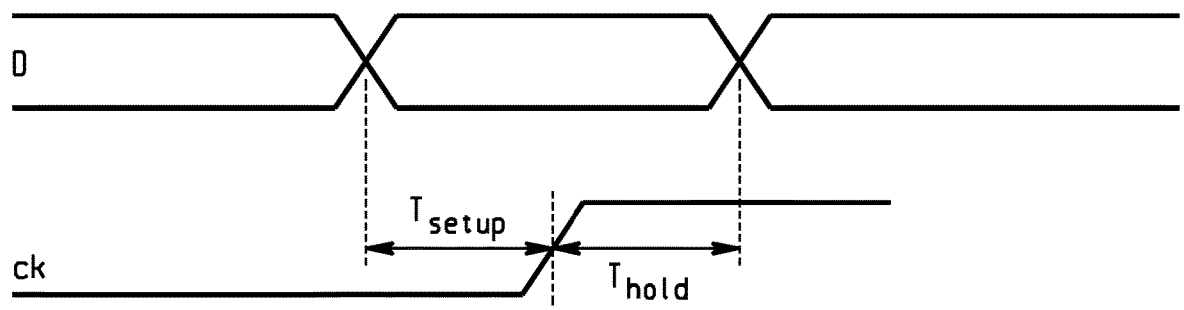
FIGS. 1 and 2 are diagrams illustrating setup and hold constraints in a timing path of a typical system-on-a-chip (SoC) design.
Figure 2:
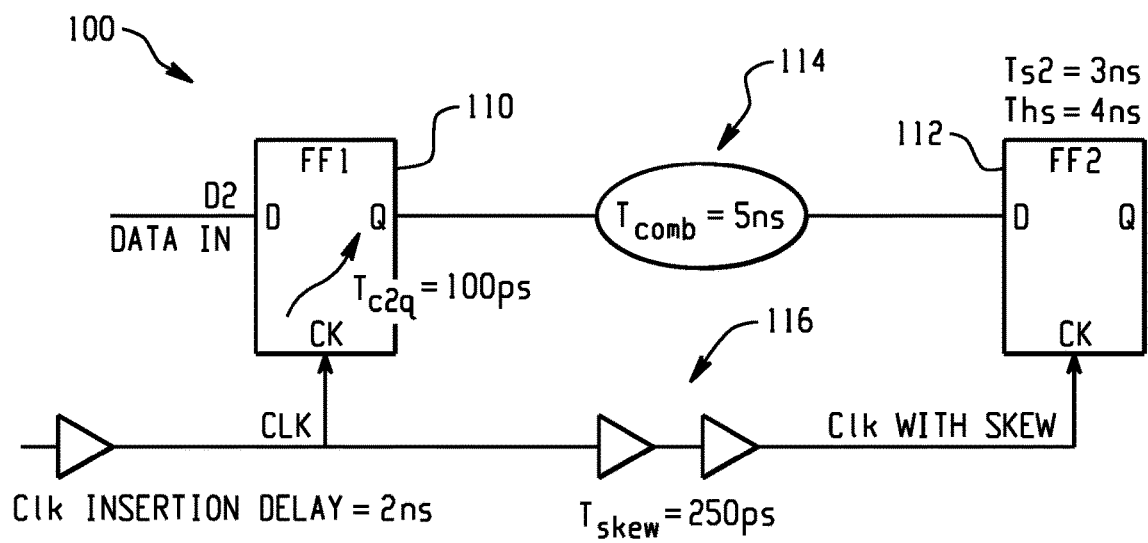

FIGS. 1 and 2 are diagrams that help illustrate setup and hold constraints found in a timing path of a typical SoC design. An illustration of setup and hold times for a sequential circuit element (e.g., a flip-flop) is shown in FIG. 1. As shown, the setup time for a sequential cell is the minimum length of time during which the data-input signal must remain stable before the active edge of the clock (or other triggered signal) to ensure correct functioning of the cell. The hold time for a sequential cell is the minimum length of time during which the data-input signal must remain stable once the edge of the clock is activated (or other triggered signal) to ensure correct functioning of the cell.

FIG. 2 is a block diagram 100 showing example setup and hold constraints in a timing path of a typical SoC design. As shown, each timing path in the SoC design includes a pair of sequential circuit elements (e.g., flip-flops) 110, 112. The illustrated diagram shows the timing delays incurred on the data path 114 and clock path 116 between a driving flip-flop 110 and a receiving flip-flop 112. The data path proceeds from the common clock branch point after the clock insertion delay through Tc2q (the time delay from the clock pin to Q pin of the FF) of the driving flip-flop (FF1) 110, through Tcomb (the time for the combinational instances on the data path), and arrives at D1 of the receiving flip-flop (FF2) 112. The clock path proceeds from the common clock branch point after the clock insertion delay, through Tskew (the time for the clock path), and arrives at the clock input (CK) of the receiving flip-flop (FF2) 112. In the illustrated example, the receiving flip-flop (FF2) 112 has a setup time (Ts2) of 3 ns and a hold time (Ths) of 4 ns. The time delay (Tcomb) incurred for the combination instances on the data path 114 is 5 ns, the time delay (Tc2q) incurred from the clock pin to the Q pin of the driving flip-flop (FF1) is 100 ps, and the time delay (Tskew) incurred for the clock path is 250 ps.

The maximum operational frequency of an integrated circuit is constrained by setup timing violation (referred to as maximum timing pushoff.) With reference to the example shown in FIG. 2, the maximum operational frequency may be determined according to the following equation:

$$F\text{max} = 1/(T\text{clk}), \text{ where } T\text{clk} = Tc2q + T\text{comb} + Ts2 - T\text{skew}$$
(Equation 1)

In the above equation, the values of Tc2q and Tcomb are increased by dynamic voltage drop of instances along the data path. The value of Tskew is also affected by dynamic voltage drop, but can be kept constant assuming instances on the clock path have no dynamic voltage drop. The value of Ts2 (the required setup time for FF2) is fixed. Therefore, in order to maximize the operational frequency of the integrated circuit, a goal of the circuit designer is to minimize the dynamic voltage drop (DvD) of instances on the data path.

Figure 3:
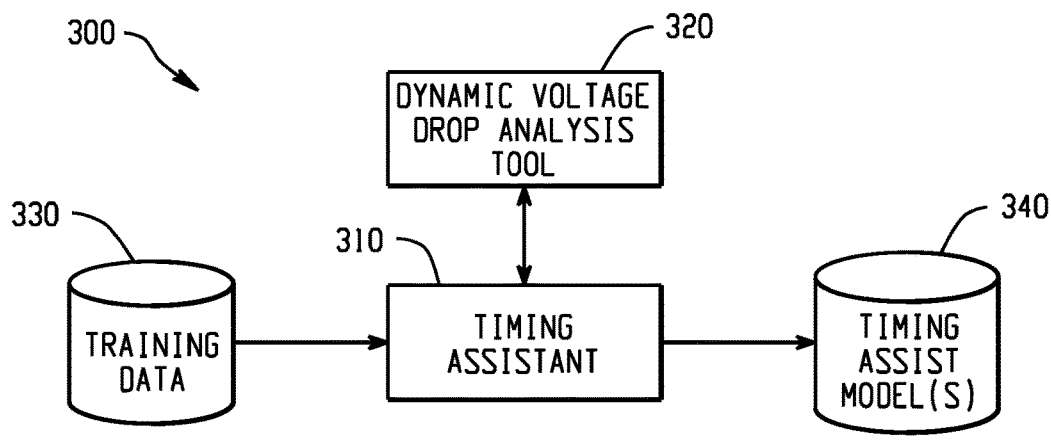
FIGS. 3 and 4 are block diagrams of example systems for performing a timing analysis of an integrated circuit design to identify a subset of critical timing paths accounting for the impact of dynamic voltage drop.
Figure 4:
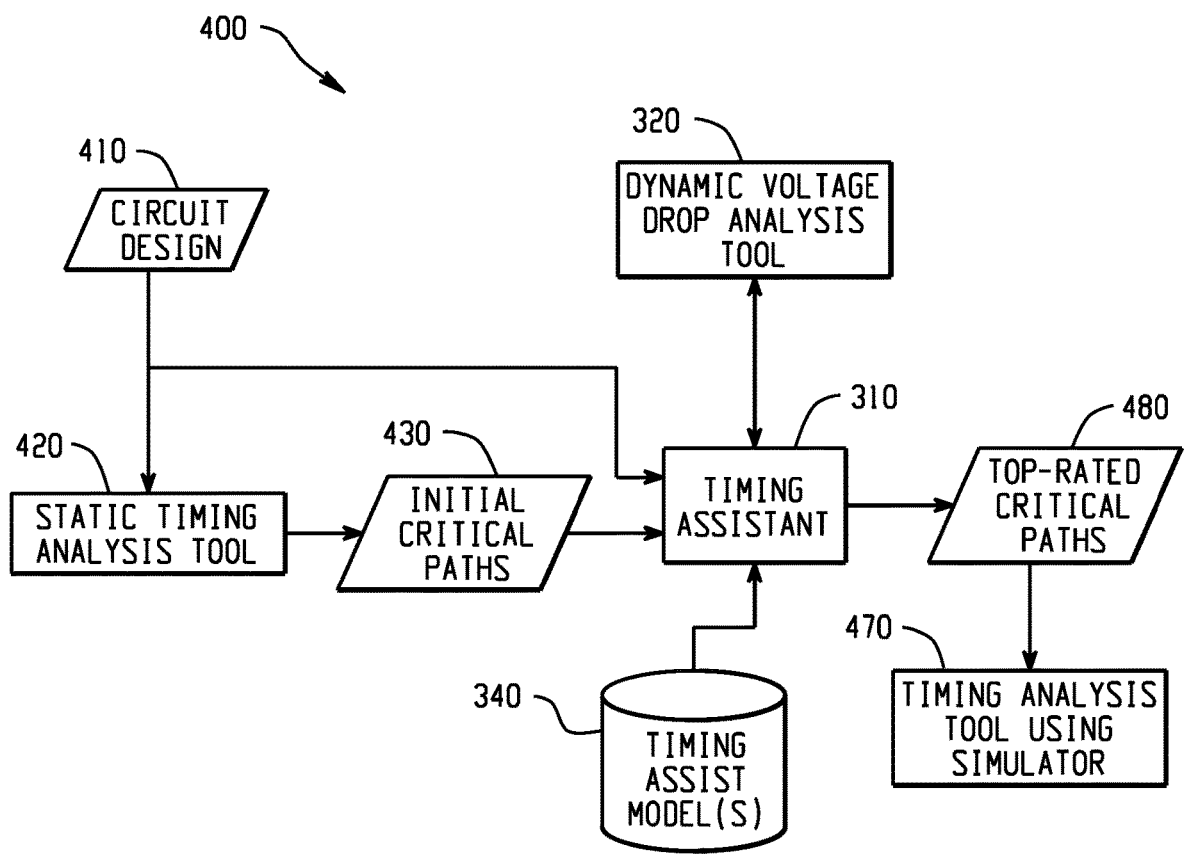

FIGS. 3 and 4 are block diagrams of example systems for performing a timing analysis on an integrated circuit design to identify a subset of critical timing paths accounting for the impact of dynamic voltage drop. FIG. 3 depicts an example of a system 300 for training one or more predictive models for use in predicting a subset of the most critical timing paths in an integrated circuit design. FIG. 4 depicts an example of a system 400 for utilizing the one or more predictive models in a timing analysis of an integrated circuit design.

With reference first to FIG. 3, the system 300 includes a timing assistant 310 and a dynamic voltage drop tool 320, which may be software applications stored on one or more non-transitory computer readable medium and executable by one or more processors. The dynamic voltage drop analysis tool 320 may, for example, be the ANSYS RedHawk software sold by Ansys, Inc. of Canonsburg, Pa.

The timing assistant 310 receives training data 330 that identifies critical timing paths from one or more previous integrated circuit designs and generates one or more predictive models 340 that may be used to predict a subset of the most critical timing paths in a new integrated circuit design. In certain embodiments, the training data 330 may be received from a customer that desires to receive timing assistant software with one or more predictive models 340 that are customized to the customer's particular technology. As described further herein, the training data 330 may identify critical paths in the one or more previous integrated circuit designs based on a static timing analysis. A critical path may, for example, be defined as a timing path that is determined from static timing analysis to have less than a predetermined threshold amount of slack.

As explained in more detail below, the timing assistant 310 may generate the one or more predictive models 340 by training a machine learning inferencing engine to predict one or more switching scenarios from the training data 330 that are likely to include the most critical timing paths, performing a dynamic voltage drop analysis on the subset of timing paths within the one or more identified switching scenarios, and further training a machine learning inferencing engine to predict the most critical timing paths from within the subset of timing paths taking into account the dynamic voltage drop analysis. A switching scenario, as described in further detail herein, corresponds to switching behavior of timing paths of a circuit based on certain input vectors applied to the design. Due to the complexity of modern circuit design, a switching scenario as described herein references a sub-structure of the circuit design rather than the entirety of the design to enable the systems and methods described herein to identify particular timing paths to be optimized/modified (e.g., via addition or subtraction of buffers to add or lessen slack) based on analysis/simulation of critical timing paths.

With reference now to FIG. 4, the one or more predictive models 340 may be used in a system 400 to perform a timing analysis on a new circuit design 410. The example system 400 includes a static timing analysis tool 420, a timing assistant 310, a dynamic voltage drop analysis tool 320, and a timing analysis (e.g., SPICE-based) tool 470, which may be software applications stored on one or more non-transitory computer readable medium and executable by one or more processors.

The new circuit design 410 may be input to the static timing analysis tool 420 to identify an initial set of critical timing paths 430. The static timing analysis tool 420 may, for example, be configured to identify a set number of critical paths ranked by slack by applying a static (e.g., unchanging over a period of time) supply voltage for a particular timing path (e.g., one or more cells on a particular timing path). The initial set of critical timing paths 430 along with the new circuit design 410 are input to the timing assistant 310. As detailed further below, the timing assistant 310 applies the one or more predictive models 340 to predict one or more switching scenarios for the new circuit design 410 that are likely to include the most critical timing paths, and utilizes the dynamic voltage drop analysis tool 320 to perform a dynamic voltage drop analysis on the subset of timing paths within the one or more identified switching scenarios. The timing assistant 310 then applies the one or more predictive models 340 to predict the most critical timing paths (i.e., the top-ranked critical paths) 480 from within the subset of timing paths taking into account the dynamic voltage drop analysis. The timing analysis tool 470 may then be used to perform a full timing analysis, such as a SPICE-based timing analysis, on only the top-ranked critical paths 480. The circuit designer may, for example, use the results of the full timing analysis to address problematic dynamic voltage drop in one or more of the top-rated critical paths 480, thus increasing the maximum operational frequency of the circuit design 410.

Figure 5:
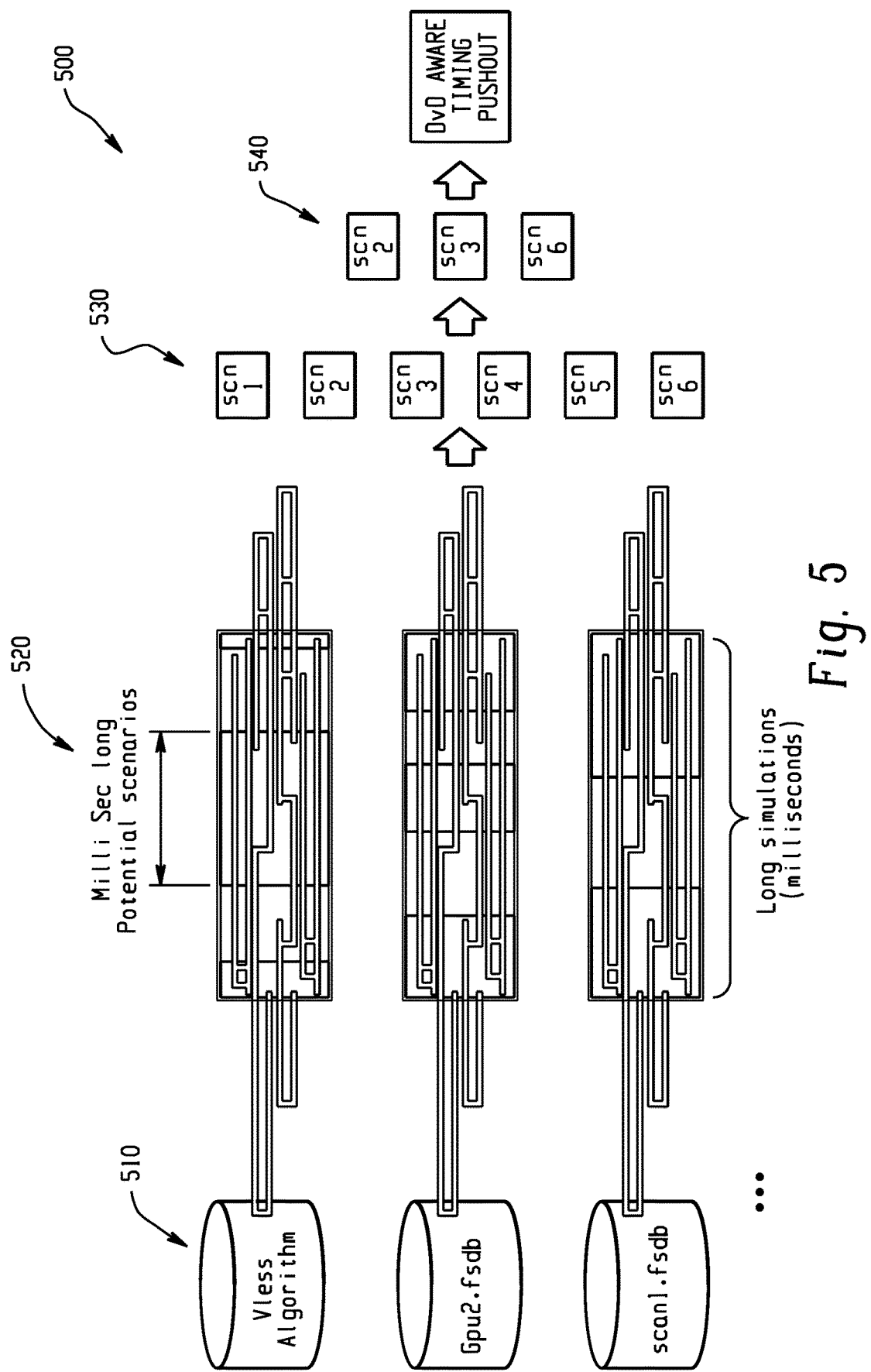
FIG. 5 is a flow diagram of an example operation of the timing assistant shown in FIGS. 3 and 4.

FIG. 5 is an example flow diagram 500 illustrating an example operation of the timing assistant 310 shown in FIGS. 3 and 4. The illustrated flow 500 creates a maximum timing pushout scenario from multiple timing scenarios generated using both vector-based and vectorless algorithms and based on various parameters from diverse analyses. The illustrated process 500 may utilize the timing assistant 310 to learn from historical or training data for more accurate prediction of one or more timing scenarios that are likely to produce a maximum timing push-off or hold time violation check.

In a first phase 510 of the illustrated flow 500, design vector simulation outputs are gathered from functional and test modes. Then, in a second phase 520 of the illustrated flow 500, potential timing scenarios are identified on critical path instances and their neighbors based, for example, on high activity and large changes. In a third phase 530, potential timing scenarios are individually scored and ranked based on metrics from diverse analyses. A predictive algorithm is then used in the fourth phase 540, as described in more detail below, in order to predict a subset of scenarios that are likely to be relevant to include timing paths with the worst timing pushout (e.g., scenarios that are likely to control those timing paths in a near-worst-case manner to provide accurate estimation of behavior of those timing paths under demanding conditions). The subset of scenarios are then further processed using a DvD analysis and further application of predictive algorithms, as detailed below, to predict the most critical timing paths.

As illustrated in FIG. 5, a user may generate timing scenarios using both vector-based and vectorless scenarios using a dynamic voltage drop analysis tool. Vector based approaches utilize pre-defined vectors (i.e., a set of one or more ordered inputs to one or more cells or blocks of the SoC design). A typical SoC is composed of multiple blocks. A vector-based scenario of a block may be generated from a subset of the total duration of VCD (Vector Change Dump) or equivalent of FSDB format from functional or test simulation tools. A vectorless-based scenario of a block may be generated from partial logic propagation and settings of gated clock controls from a power analysis module of a dynamic voltage drop analysis tool. For each block, the user may, for example, select an fsdb (i.e., the vector-based operation) or use a vectorless algorithm to select a vector (i.e. switching scenario comprising a set of one or more ordered inputs) for an individual block. When performing a vector-based simulation for an SoC design with many blocks (e.g, 10-15 blocks), there may be a millisecond long fsdb file (i.e., simulation waveform data) for each block, which is too long for processing. The user may therefore select a shorter duration, such as 4000 picoseconds, for each individual block to compose the final vector operations. As a result, the analysis illustrated at steps 510 and 520 of FIG. 5 typically results in far too many combinations to perform a dynamic voltage drop analysis. Given so many paths, a goal of the illustrated process is to predict the most critical paths without running the DvD analysis or a SPICE-based analysis. Then, only the most critical paths are used for a DvD and SPICE-based timing analysis.

The timing assistant 310, an example of which is shown in FIGS. 3 and 4, may include a two-stage inference engine that may, for example, be trained using training data that is specific to the ultimate user. Example systems and methods for the application and training of the two-stage inference engine of the timing assistant 310 are illustrated in FIGS. 6-16. The first stage of the inference engine (i.e., the critical scenario(s) predictor) is referred to herein and in the accompanying figures as "Scenario Predictor," and the second stage of the inference engine (i.e., the critical path predictor) is referred to as "Path Predictor."

Figure 6:
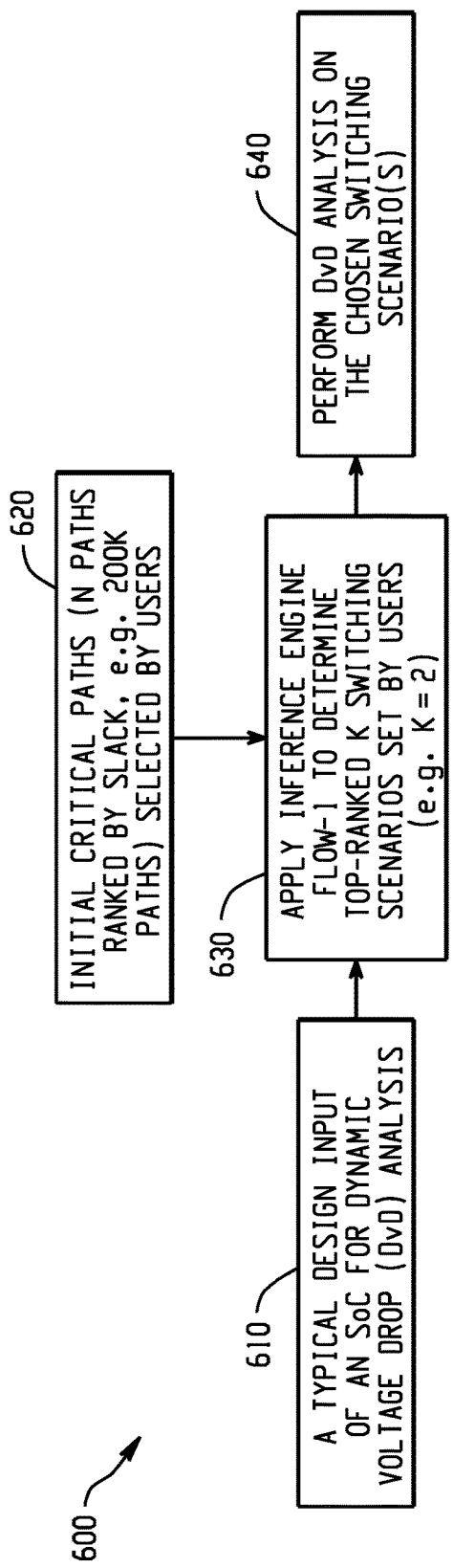
FIG. 6 is a flow diagram depicting an example method for applying a first stage of a timing assistant inference engine to predict one or more top-ranked switching scenarios.

FIG. 6 is a flow diagram 600 depicting an example method for applying the first stage ("Scenario Predictor") of the timing assistant inference engine to select one or more top-ranked switching scenarios for maximum timing pushout (i.e., setup) of a circuit design. The example method 600 includes two inputs, 610 and 620. The first input 610 includes an integrated circuit (e.g., SoC) design file, such as would be input to a typical dynamic voltage drop (DvD) analysis. The second input 620 includes a predetermined number (N) of initial critical timing paths that have been identified for the integrated circuit design, for example using a static timing analysis (STA) tool. The predetermined number (N) of critical timing paths 620 may, for example, be selected based on slack. For instance, the circuit timing paths may be ranked (e.g., determined by a STA tool) based on slack, and the top N timing paths ranked by slack may be selected as the initial critical timing paths 620. In embodiments, the predetermined number (N) of initial critical timing paths may, for example, be between 200 k and 1 million paths.

At step 630, the first stage ("Scenario Predictor") of the timing assistant inference engine is applied to determine a predetermined number (K) of top-ranked switching scenarios resulting in the initial critical timing paths 620. The number (K) of top-ranked switching scenarios determined by the timing assistant may, for example, be selected by a user. The Scenario Predictor inference engine model is applied at step 630, without performing a DvD or SPICE analysis, to predict the critical paths that will be most likely affected (e.g., a top N critical paths, a top X % of critical paths) by dynamic voltage drop for the setup time violation. That is, the first stage ("Scenario Predictor") is used to predict which timing scenarios from the design input 610 should be put through a full DvD analysis. It should be understood that the design input may include many combinations of scenarios (as explained above with reference to FIG. 5), possibly including a millisecond fsdb and/or vectorless algorithm for each block with, for example, a 4000 picosecond duration for each block, resulting in potentially millions of combinations for a typical SoC. It may therefore not be feasible (or possible) to perform a DvD analysis for all such combinations. The Scenario Predictor inference engine is therefore used to identify which one or more (K) scenarios to run through the DvD analysis, based on a prediction of which scenario(s) will include critical timing paths having the biggest effect on the maximum timing pushout and/or the holdtime violation. The training and operation of the Scenario Predictor inference engine is described further below with reference to FIGS. 7-11.

At step 640, a DvD analysis is performed on the one or more (K) selected switching scenarios. The number (K) of selected switching scenarios may, for example, be selected by a user based on the amount of available time and resources for performing the DvD analysis. The DvD analysis 640 may be performed using an existing DvD analysis tool, such as the ANSYS RedHawk software sold by Ansys, Inc. of Canonsburg, Pa.

Figure 7:
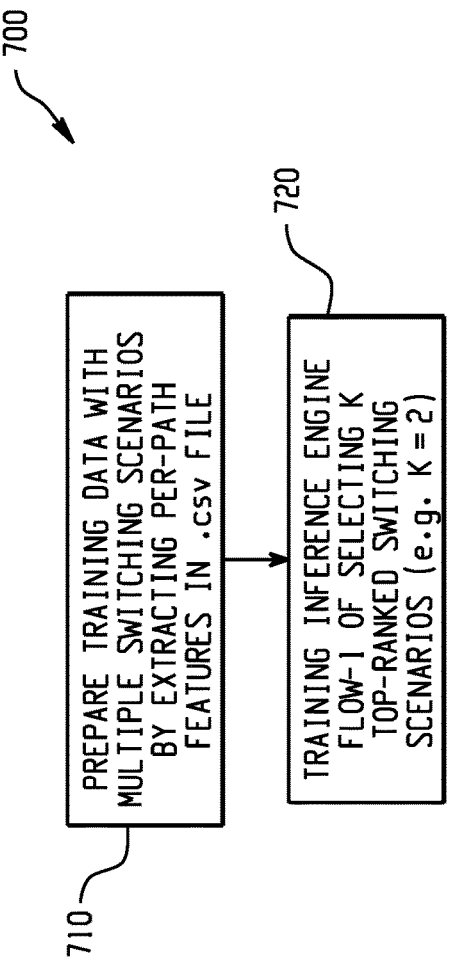
FIGS. 7-11 are diagrams depicting example systems and methods for training and operating and first stage of the timing assistant inference engine.

FIG. 7 is a flow diagram depicting an example method 700 for training the Scenario Predictor inference engine. The Scenario Predictor training data is prepared at step 710. In embodiments, the Scenario Predictor inference engine may be trained based on actual customer data, as explained above. The training data may, for example be automatically collected with multiple switching scenarios by extracting the path features in a data file, such as a .csv file. A switching scenario may, for example be a combination of switching vectors applied to an individual block in an SoC (e.g., containing 10-20 blocks.) As understood by persons skilled in the art, a .csv file is a "comma separated file" with each row containing input features and output labels. An output label identifies the expected output result (i.e., objective), such as a slack calculation using a SPICE-based simulator, for example the output label may identify the objective as delta slack (as detailed below.) Once the input features and the output labels are extracted, one or more machine learning methods are used at step 720 to train the Scenario Predictor inference engine to select the one or more (K) top-ranked switching scenarios, as described further below with reference to FIGS. 8-11.

As noted above, the input features and output label(s) may be extracted from a data file, such as a .csv file. The following is a list of example path-based input features that may be selected for training the Scenario Predictor inference engine for predicting one or more top-ranked switching scenarios performing maximum timing pushout (i.e., setup) check. These features may, for example, be available from a typical dynamic voltage drop analysis tool. It should be understood, however, that other examples may include additional and/or different input features.

Avg_timing_sensitivity_wrt_dvd: average of per instance timing sensitivity with respect to DvD on the data path;

Max_timing_sensitivity_wrt_dvd: maximum of per instance timing sensitivity with respect to DvD on the data path (to detect which particular instance will be affected by the dynamic voltage drop)—some particular instances may have severe DvD, for example due to a missing via, that can contribute greatly to the final delta slack of the path.

Avg_switching_status: average of per instance switching state (1 or 0 per instance switching)(the average switching status will be proportional to the complexity of the architecture of the data path instance—the smaller the number, the more complicated the architecture);

Avg_effective_R: average of per instance effective resistance (R) from bump to instance VDD/VSS pin (a high effective resistance will result in a larger dynamic voltage drop for the instance);

Max_effective_R: maximum of per instance effective resistance (R) from bump to instance VDD/VSS pin;

Num_of_datapath_instances: number of instances on the data path;

Avg_rail_connected_datapath_Ipeak: average of rail-connected peak current, including neighboring instances per instance, on the data path (the peak current including neighboring instances on the same rail); and Max_rail_connected_datapath_Ipeak: maximum of rail-connected peak current including neighboring instances per instance on the data path.

As mentioned above, the path-based output label(s) identify the expected output result, such as a slack calculation using a SPICE-based simulator. As an example, the output label(s) for training the Scenario Predictor inference engine for predicting one or more top-ranked switching scenarios performing maximum timing pushout (i.e., setup) check may include the following:

Path_based_delta_slack_from_Simulator: for all the timing paths in the training data, run a simulator (such as SPICE) to obtain delta_slack (i.e., time difference of setup time with worst DvD on data path instances and setup time with nominal VDD on data path instances) for each timing path by keeping nominal voltage for the instances on the clock path and worst voltage drop for the instances on the data path.

The following is a list of example path-based input features that may be selected for training the Scenario Predictor inference engine for predicting one or more top-ranked switching scenarios performing hold time violation check. It should be understood, however, that other examples may include additional and/or different input features.

Avg_timing_sensitivity_wrt_dvd: average of per instance timing sensitivity with respect to DvD on the clock path;

Max_timing_sensitivity_wrt_dvd: maximum of per instance timing sensitivity with respect to DvD on the clock path;

Avg_switching_status: average of per instance switching state (1 or 0 per instance switching) on clock path;

Avg_effective_R: average of per instance effective resistance (R) from bump to instance VDD/VSS pin on clock path;

Max_effective_R: maximum of per instance effective resistance (R) from bump to instance VDD/VSS pin on clock path;

Num_of_clock_path_instances: number of instances on the clock path;

Avg_rail_connected_clock_Ipeak: average of rail-connected peak current including neighboring instances per instance on the clock path; and Max_rail_connected_clock_Ipeak: maximum of rail-connected peak current including neighboring instances per instance on the clock path.

As an example, the output label(s) for training the Scenario Predictor inference engine for predicting one or more top-ranked switching scenarios performing hold time violation check may include the following:

Path_based_delta_slack_from_Simulator: for all the timing paths in the training data, run a simulator (such as SPICE) to obtain delta_slack (i.e., time difference of hold time with worst DvD on clock path instances and hold time with nominal VDD on clock path instances) for each timing path by keeping nominal voltage for the instances on the data path and worst voltage drop for the instances on the clock path.

For setup time check, output label results may be generated based on setup time check, e.g., using the worst DvD for data path instances and the nominal VDD for clock path instances. For hold time check, output label results may be generated based on hold time check, e.g., using the nominal VDD for data path instances and the worst DvD for clock path instances.

Figure 8:
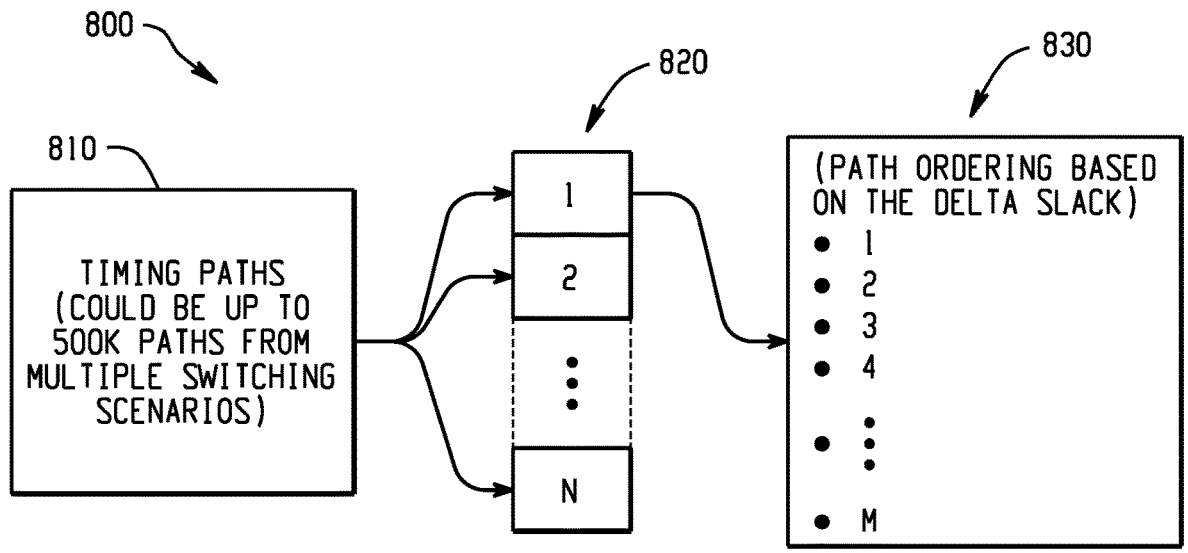

FIG. 8 is a flow diagram showing an example method of training and operation 800 for the Scenario Predictor inference engine. The example method 800 includes three steps, 810, 820 and 830. At step 810, the Scenario Predictor inference engine receives numerous timing paths (e.g., 500 k paths) coming from multiple scenarios. For instance, the input 810 may include five scenarios with 500 k timing paths (e.g., 100 k paths per scenario.) As explained, it is not feasible to perform a full SPICE-based simulation on this many timing paths. Thus, the Flow 1 inference engine is used to predict a ranking of the timing scenarios most likely to include the most critical paths based, for example, on the input features discussed above, in order to differentiate the paths that are more likely to be affected by DvD.

At step 820, the Scenario Predictor inference engine uses a bin-based classifier to classify the timing paths into a number of bins. The number (N) of bins and/or the number of paths within each bin may, for example, be set by a user. Operation of the bin-based classifier is described in more detail below with reference to FIG. 9.

Then, at step 830, the timing paths in the top-most bin are ranked based, for example, on predicted delta slack. A weighted algorithm is then used on the ordered list to determine which of the top K switching scenarios should be included in a DvD analysis. As explained above, the ordered timing paths are derived from a multiple scenario input (e.g., 5 scenarios), and a goal of the Scenario Predictor process is to differentiate which one or more scenarios should go through the DvD analysis. Because the top bin includes the most critical timing paths, it is the most important bin for this analysis. By determining, using the weighted algorithm, the one or more scenarios that result in the paths in this top-ranked bin, the Scenario Predictor inference engine can predict the one or more most problematic scenarios on which to perform a DvD and SPICE-based timing analysis. The operation of ranking the paths within the top bin is described in more detail below with reference to FIG. 10, and the weighted algorithm used to select the one or more most problematic scenarios is described in more detail below with reference to FIG. 11.

Figure 9:
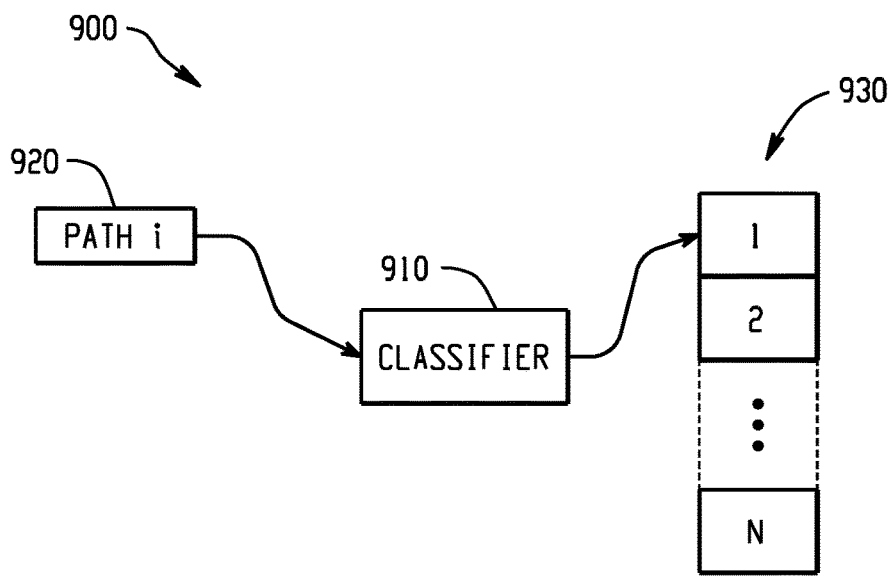

With reference first to FIG. 9, this figure is a block diagram 900 further illustrating the bin-based classification operation of the Scenario Predictor inference engine. As illustrated, a classifier engine 910 is used to classify each timing path 920 in the received scenario data into one of N number of bins 930 based on a criteria ranking, such as based on the delta slack (i.e., label in the training data) calculated by a static timing analysis (STA) tool. It should be understood that the delta slack is only available in the inference engine training data but not available in the new testing case. Thus, the classification engine 910 may utilize one or more known machine learning techniques, such as a neural network, Random Forest, XGBoost, etc. For example, the classifier engine 910 may utilize a deep neural network architecture with 3-6 hidden layers and with a number of neurons larger than the input feature list per layer as described by Yann LeCun, Yoshua Bengio, and Geoffrey Hinton, *Deep learning, Nature international Journal of Science*, 521.7553 (2015), pp. 436-444. In another example, the classifier engine 910 may utilize a consensus result from a Random Forest ensemble of decision trees as described by L. Breiman, Random Forests, Machine Learning, Vol. 45, Issue 1 (October 2001), pp. 5-32. In yet another example, the classifier engine 910 may utilize the XGBoost gradient-based boosting method, as described by T. Chen, C. Guestrin, *A Scalable Tree Boosting System*, KDD '16 Proceedings of the 22$^{nd}$ ACM SIGKDD International Conference on Knowledge Discovery and Data Mining 2016, pp. 785-794. In embodiments, the classifier engine 910 may utilize a known stacked ensemble operation to combine results from multiple machine learning operations. For example, a stacked ensemble operation may be used to combine the results of a neural network, Random Forest decision tree and XGBoost method, using a second-level algorithm to provide a weighted average of the three predictions, for example as described by L. Breiman, Stacked Regressions, Machine Learning, 24, 49-64 (1996). It should be understood that the above machine learning techniques may be utilized because the design data associated with the previous circuit designs provided by a particular designer or customer will typically exhibit a pattern of dynamic voltage drop, and therefore machine learning techniques provide a good method for generating a model based on the data provided by a particular designer or customer. For example, a GPU design house will typically encounter a different kind of timing path failure due to its own pattern of dynamic voltage drop from their GPU designs.

As illustrated in FIG. 9, the output of the bin-based classifier 910 is a ranking of the timing paths into bins 1-N, where the number of bins (N) may be set (e.g., by a user) to determine the number of paths within each bin based on the predicted delta slack or predicted hold time violation. In examples, the number (N) of bins may be 5 or 10. The paths in the top bin will have worse delta slack (the most negative the value, the worst it could be) compared to the next bin, etc.

Figure 10:
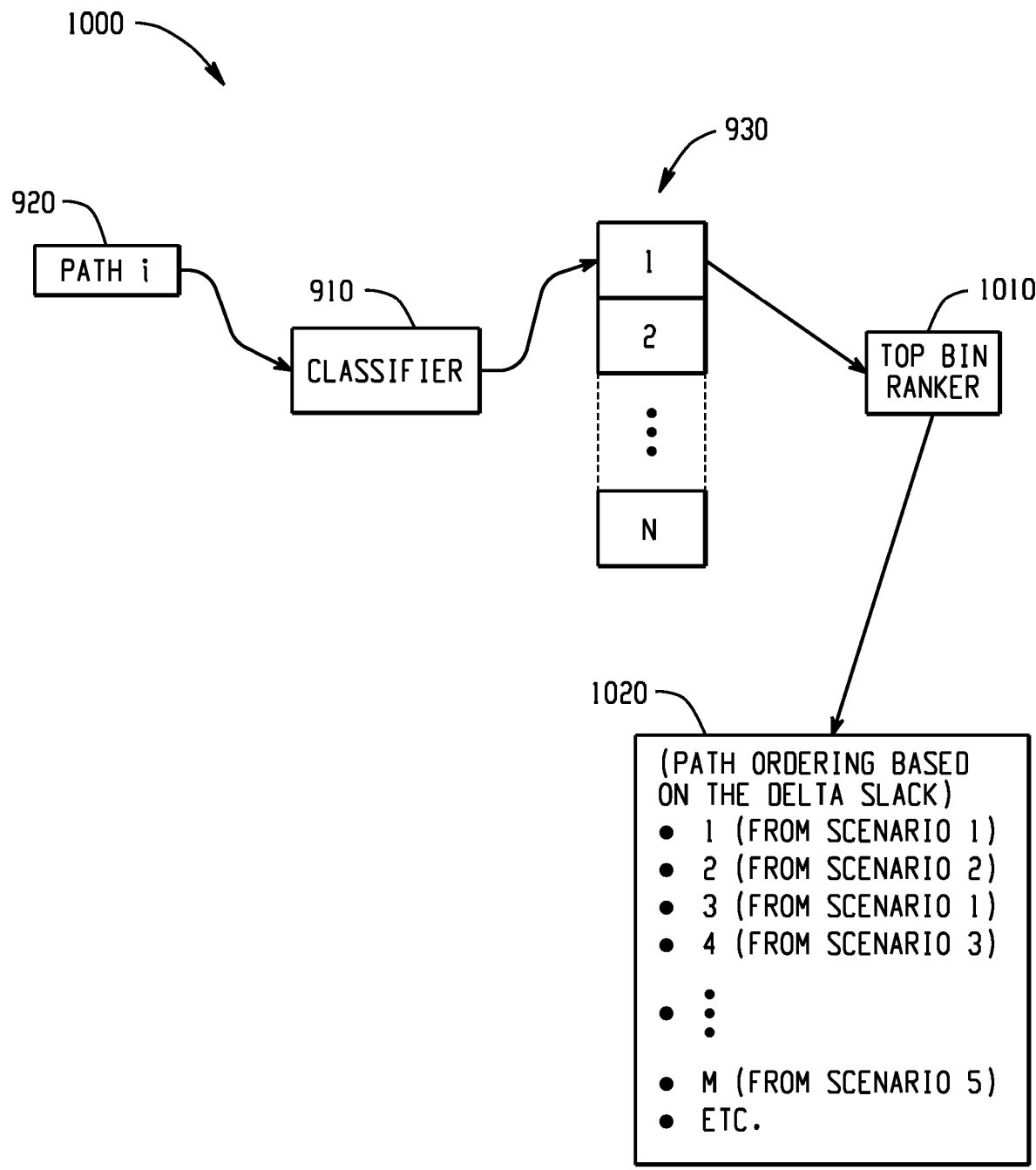

FIG. 10 is a block diagram 1000 further illustrating the top bin ranking operation of the Scenario Predictor inference engine. As shown, a top bin ranker engine 1010 is used to generate an ordered list 1020 of the timing paths in the top bin. As shown in the illustrated example, the ordered list 1020 of paths in the top bin identifies a ranking of the timing paths according to a criteria such as predicted delta slack or predicted hold time violation, and also identifies which scenario (e.g., 1-5) the path originated from. For instance, in the illustrated example, the top ranked path and the third ranked path are from scenario 1, the second ranked path is from scenario 2, the fourth ranked path is from scenario 3, and the last (M) ranked path is from scenario 5.

In embodiments, the paths in the top bin may be ranked using one or more known methods, such as the RankSVM and LambdaMart methods. The RankSVM method is described in Ralf Herbrich, Thore Graepel, Klause Obermayer, *Support Vector Learning for Ordinal Regression*, 1999. The LanbdaMart method is described in Christopher J. C. Burges, *From RankNet to LambdaRank to LambdaMART: An Overview*, Microsoft Research Technical Report MSR-TR-2010-82. The predicted ranking based on delta slack in the top bin composed of paths from different scenarios will typically exhibit a pattern of path failures common to the designs of the particular designer or customer. Machine learning techniques, as described herein, may therefore be used to detect the patterns particular to a user, and therefore typically provide a better solution that a fixed algorithm that is applied in the same way for all types of designs. In embodiments, Learning to Rank methods (RankSVM and LambdaMART) may be used to provide the ranking of paths in the top bin. In other examples, however, a regression method of predicting delta slack per path could be used.

In certain embodiments, the top bin ranking engine 1010 may utilize a stacked ensemble operation to combine the rankings provided by multiple methods, such as a combination of RankSVM and LambdaMart rankings. In this way, the sorting order per-timing path inside the top bin may use a weighted average of the order given by multiple ranking methods to provide a consensus result.

Figure 11:
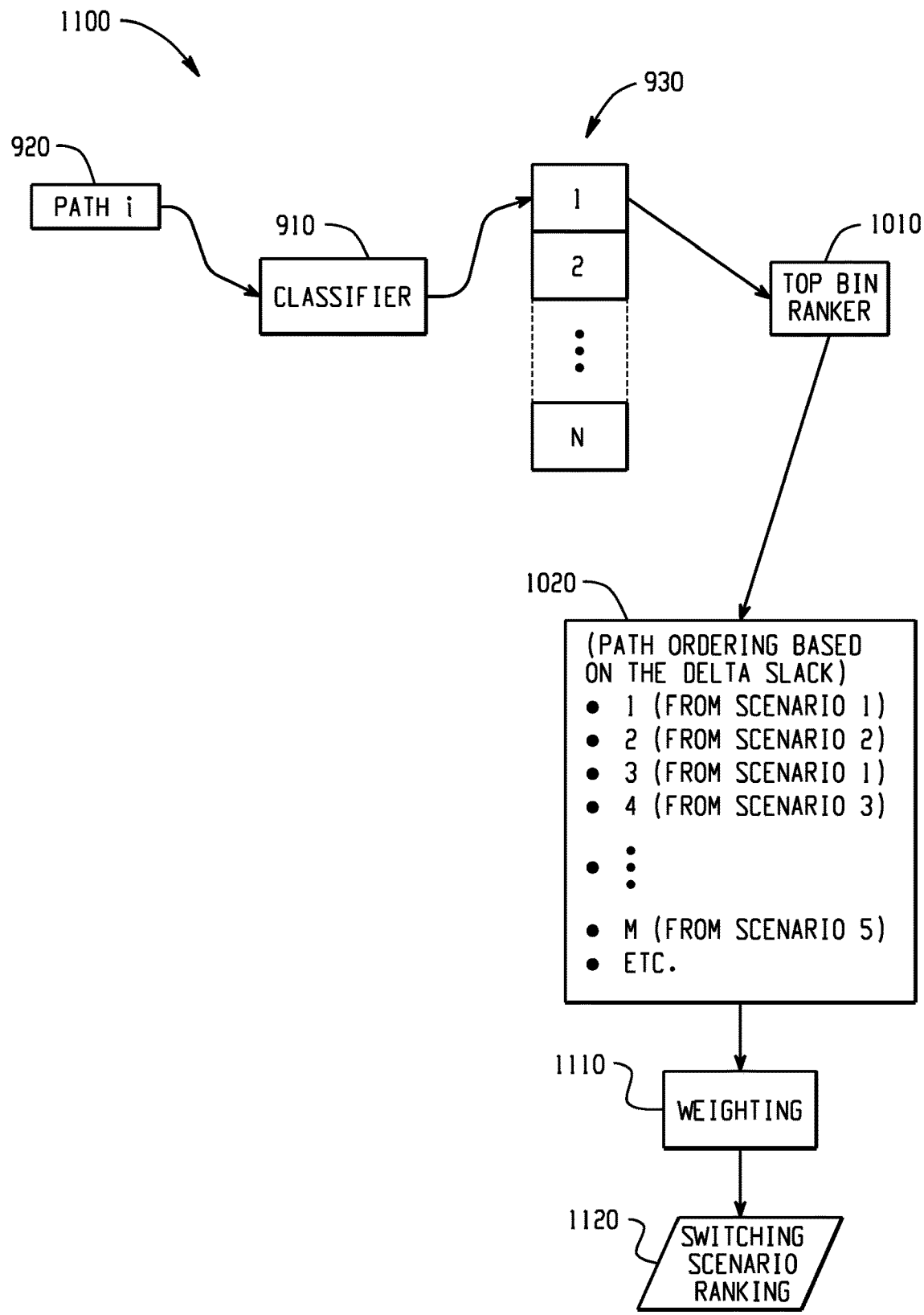

FIG. 11 is a block diagram 1100 further illustrating a weighting operation of the Scenario Predictor inference engine. As shown, a weighting engine 1110 may be utilized to provide an ordered list 1120 that ranks the switching scenarios (e.g., 1-5) according to their likelihood of including the most critical timing paths. The weighting engine 1110 may rank the switching scenarios using a weighting factor that linearly scales (e.g., from 1 to 10) with the position of the timing path in the top bin ordered list 1020. For example, the top ranked timing path may have a position weighting of 10, and the bottom ranked timing path may have a position weighing of 1.0, with the weighting for the remaining timing paths being linearly scaled between 1 and 10. The per path position score for a timing path may be based on the position of the path in the ranking order from 0 to 1, with the top path having a score of 1 and the bottom path have a score of zero. For instance, consider the simple example set forth below that includes a top bin path ordering with only four paths from three scenarios:

1 (from scenario 1)
2 (from scenario 2)
3 (from scenario 1)
4 (from scenario 3)

In the above example, the weighting engine 1110 may rank the three scenarios as follows:

scenario_1_score=path 1(from scenario 1)*10+path 3 (from scenario 1)*4=1*10+0.25*4=11;

scenario_2_score=path 2 (from scenario 2)*7=0.667*7=4.669; and scenario_3_score=path 4 (from scenario 3)*1=0*1=0

The ranked list 1120 of switching scenarios may then be used to select the top K (e.g., 1 or 2) scenarios for a more time and resource intensive DvD analysis. In embodiments, the Scenario Predictor inference engine may also flag scenarios that are not selected by the weighting engine 1110 due to insufficient weight, but that have a very high position scoring path. In this way, the engine may indicate that the flagged scenarios cover potential failures that are not identified in the selected scenarios, indicating that the K value may be too small.

Figures 12, 13:
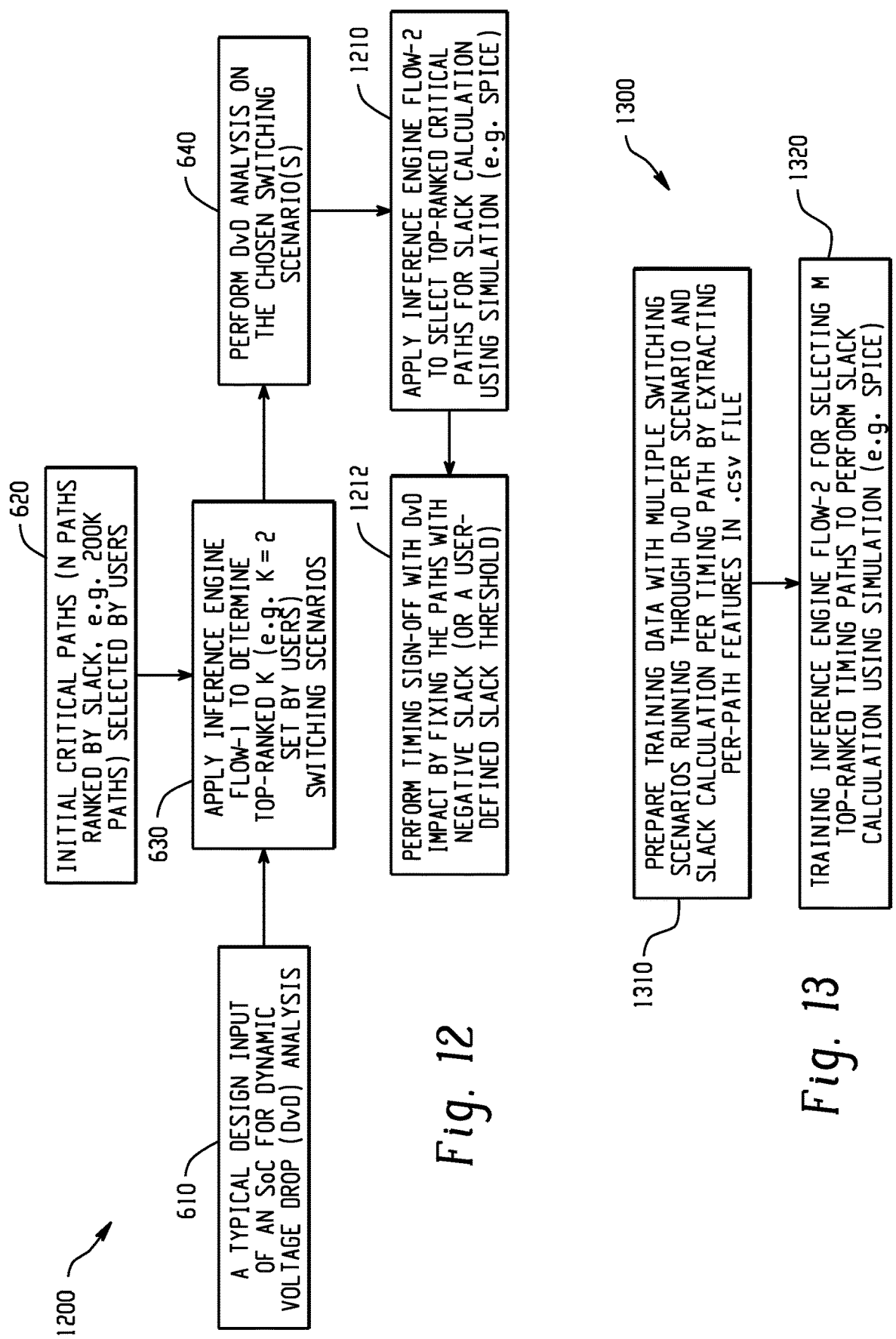
FIG. 12 is a flow diagram depicting an example method for applying a second stage of the timing assistant inference engine to predict top-ranked critical paths for a full simulation analysis.
FIGS. 13-16 are diagrams depicting example systems and methods for training and operating the second stage of the timing assistant inference engine.

FIG. 12 is a flow diagram 1200 depicting an example method for applying the second stage ("Path Predictor") of the timing assistant inference engine to select top-ranked critical paths for a full simulation analysis. Included in FIG. 12 are the Scenario Predictor steps 610, 620, 630, 640 described above with reference to FIG. 6. As further illustrated on FIG. 12, a DvD analysis is performed at step 640 on the one or more scenarios selected by the Scenario Predictor operations. The DvD analysis 640 determines a revised voltage for the particular timing path for the one or more scenarios selected by the Scenario Predictor operations. The DvD analysis outputs a DvD metric that may be a revised voltage (e.g., a single revised voltage, a dynamic revised voltage over time) or other DvD metric that will typically be more accurate representation of voltage behavior than a static supply voltage utilized in the static timing analysis. The second stage of the timing assistance interference engine ("Path Predictor") is applied at step 1210 to predict the most critical paths from the one or more top-ranked switching scenarios (e.g., as identified on the ranked list 1120 of switching scenarios as shown in FIG. 11.) The Path Predictor inference engine predicts which timing paths from the chosen scenario(s) will most likely be affected by dynamic voltage drop (e.g., which paths will have the biggest DvD impact on delta slack) based on the revised voltage or other DvD metric determined by the DvD analysis 640. The top-ranked critical paths identified by the Path Predictor inference engine are then put through a full timing simulation (e.g., a SPICE-based simulation) at step 1212, and paths with a negative slack (or a slack below a pre-defined threshold) or with large slack variation (e.g., obtained from SPICE-based simulation) may be modified in the circuit design, for example to reduce the amount of dynamic voltage drop within the path. Examples of the training and operations of the Path Predictor inference engine to predict the most critical paths are further described below with reference to FIGS. 13-16.

FIG. 13 is a flow diagram depicting an example method 1300 for training the Path Predictor inference engine. The Path Predictor training data is prepared at step 1310. The Path Predictor training data may include per path features for multiple switching scenarios, which may be extracted from a .csv file similar to the training data for Scenario Predictor. In addition, the Path Predictor training data also includes the DvD data determined by performing a DvD analysis on the one or more scenarios selected by the Scenario Predictor operations (e.g., at step 640 in FIG. 12). One or more machine learning methods are then used at step 1320 to train the Path Predictor inference engine to select a predetermined number (M) of top-ranked timing paths on which to perform a full (e.g., SPICE-based) timing simulation, as described further below with reference to FIGS. 14-16.

As noted above, the input features and output label(s) for training the Path Predictor inference engine may be derived from the DvD analysis and extracted from a data file, such as a .csv file. The following is a list of example path-based input features that may be selected for training the Path Predictor inference engine for predicting one or more top-ranked timing paths for maximum timing pushout (i.e., setup) check. It should be understood, however, that other examples may include additional and/or different input features.

Avg_timing_sensitivity_wrt_dvd: average of per instance timing sensitivity with respect to DvD on the data path;

Max_timing_sensitivity_wrt_dvd: maximum of per instance timing sensitivity with respect to DvD on the data path;

Avg_switching_status: average of per instance switching state (1 or 0 per instance switching);

Avg_effective_R: average of per instance effective resistance (R) from bump to instance VDD/VSS pin;

Max_effective_R: maximum of per instance effective resistance (R) from bump to instance VDD/VSS pin;

Num_of_datapath_instances: number of instances on the data path;

Avg_rail_connected_Ipeak: average of rail-connected peak current per instance on the data path;

Max_rail_connected_Ipeak: maximum of rail-connected peak current per instance on the data path;

Avg_worst_voltage_drop: average of per instance worst voltage drop on the data path; and Max_worst_voltage_drop: maximum of per instance worst voltage drop on the data path.

As explained above, the path-based output label(s) identify the expected output result, such as a slack calculation using a SPICE-based simulator. As an example, the output label(s) for training the Path Predictor inference engine for predicting one or more top-ranked timing paths for maximum timing pushout (i.e., setup) check may include the following:

Path_based_delta_slack_from_Simulation: for all the timing paths in the training data, run a simulation to obtain delta slack (i.e., time difference of setup time with worst DvD on data path instances and setup time with nominal VDD on data path instances) for each timing path by keeping nominal voltage for the instances on the clock path and worst voltage drop for the instances on the data path.

The following is a list of example path-based input features that may be selected for training the Path Predictor inference engine for predicting one or more top-ranked timing paths for performing hold time violation check. It should be understood, however, that other examples may include additional and/or different input features.

Avg_timing_sensitivity_wrt_dvd: average of per instance timing sensitivity with respect to DvD on the clock path;

Max_timing_sensitivity_wrt_dvd: maximum of per instance timing sensitivity with respect to DvD on the clock path;

Avg_switching_status: average of per instance switching state (1 or 0 per instance switching) on the clock path;

Avg_effective_R: average of per instance effective resistance (R) from bump to instance VDD/VSS pin on the clock path;

Max_effective_R: maximum of per instance effective resistance (R) from bump to instance VDD/VSS pin on the clock path;

Num_of_datapath_instances: number of instances on the clock path;

Avg_rail_connected_Ipeak: average of rail-connected peak current per instance on the clock path;

Max_rail_connected_Ipeak: maximum of rail-connected peak current per instance on the clock path;

Avg_worst_clock_voltage_drop: average of per instance worst voltage drop on the clock path; and Max_worst_clock_voltage_drop: maximum of per instance worst voltage drop on the clock path.

As an example, the output label(s) for training the Path Predictor inference engine for predicting one or more top-ranked timing paths for performing hold time violation check may include the following:

Path_based_delta_slack_from_Simulation: for all the timing paths in the training data, run a simulation (e.g., SPICE) to obtain delta_slack (i.e., time difference of hold time with worst DvD on Clock Path instances and hold time with nominal VDD on clock path instances) for each timing path by keeping nominal voltage for the instances on the data path and worst voltage drop for the instances on the clock path.

For setup time check, label results may be generated based on setup time check, i.e., using the worst DvD for data path instances and nominal VDD for clock path instances. For hold time check, label results may be generated based on hold time check, i.e., using nominal VDD for data path instances and the worst DvD for clock path instances.

Figure 14:
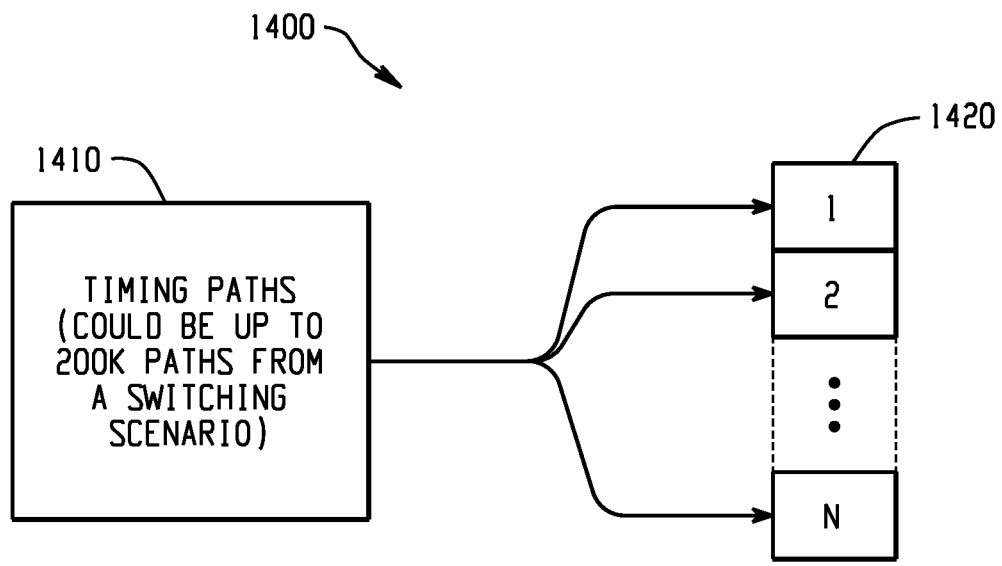

FIG. 14 is a flow diagram showing an example method 140 of training and operation for the Path Predictor inference engine. At step 1410, the Path Predictor inference engine receives the timing paths from the one or more top-ranked timing scenarios (determined in Scenario Predictor). As illustrated, the input 1410 to the Path Predictor inference engine may include numerous timing paths (e.g., up to 200 k) from the one or more top-ranked scenarios, such that it is not feasible (or possible) to run a full (e.g., SPICE-based) timing analysis on all of the paths. Thus, the Path Predictor inference engine is used to predict a ranking of the most critical paths (e.g., the top 20 k or 40 k paths) based, for example, on the input features discussed above, in order to differentiate the paths that are more likely to be affected by DvD.

At step 1420, the Path Predictor inference engine uses a bin-based classifier to classify the timing paths into a number (N) of bins. The number (N) of bins and/or the number of paths within each bin may, for example, be set by a user. Operation of the bin-based classifier is described in more detail with reference to FIG. 15.

Figure 15:
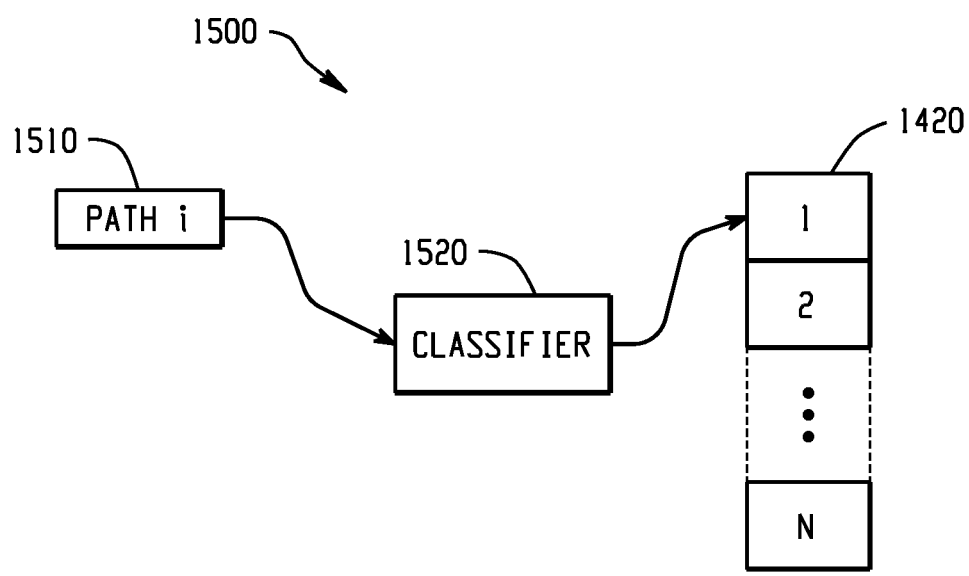

FIG. 15 is a block diagram 1500 further illustrating the bin-based classification operation of the Path Predictor inference engine. As illustrated, a classifier engine 1520 is used to classify each timing path 1510 in the one or more top-ranked scenario into one of a predetermined number (N) of bins 1420 based on a criteria ranking, such as delta slack. The number of paths in the N bins may, for example, be determined by users. The classification engine 1520 may operate in the same way as the bin classification engine 910 for the Scenario Predictor inference engine (described above), for example utilizing one or more known machine learning techniques, such as a neural network, Random Forest, XGBoost, etc., or a stacked ensemble operation to combine results from multiple machine learning operations.

Figure 16:
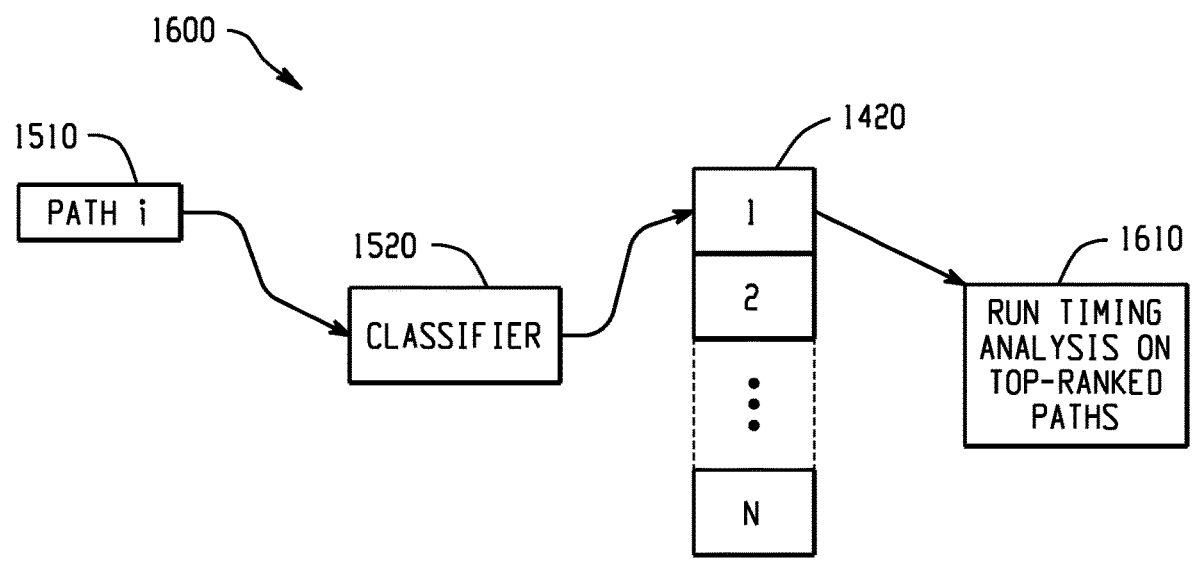

FIG. 16 is a block diagram 1600 further illustrating the operation of the Path Predictor inference engine. As shown in FIG. 16, once the timing paths from the one or more top-ranked scenario have been classified into bins, all of the timing paths in the top-ranked bin may be passed to a timing analysis tool (e.g., a SPICE-based tool) for a full timing analysis to identify and correct paths with a critical timing issue (e.g., negative slack) caused, at least in part, by dynamic voltage drop. Because a full timing analysis is performed on all of the paths in the top-ranked bin, it is not necessary to further rank the critical paths within the bin(s). The total number of timing paths passed to full timing analysis may, for example, be determined by setting the number (N) of bins and/or the number of paths within each bin, or in other embodiments by selecting more than one bin (e.g., the top two bins) for full timing analysis.

Systems and methods as described herein may be performed using a simulation engine, which may take the form of a computer-implemented simulation engine for executing a simulation, such as through the use of software instructions stored on a non-transitory computer-readable medium. A simulation, in one embodiment, is a computer-implemented imitation of a real-world process or system using one or more models. The models, in that example, represent characteristics, behaviors, and functions of selected physical systems or processes (e.g., the switching scenarios for the circuit design). The models represent behaviors of the system, while the simulation represents the operation of the system over time. A simulation result represents a characteristic of the physical system, as represented by the simulation, at one or more point within the simulation (e.g., at the end of the simulation, at t=35 seconds into the simulation).

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The methods and systems described herein may be implemented using any suitable processing system with any suitable combination of hardware, software and/or firmware, such as described below with reference to the non-limiting examples of FIGS. 17, 18A, 18B and 18C.

Figure 17:
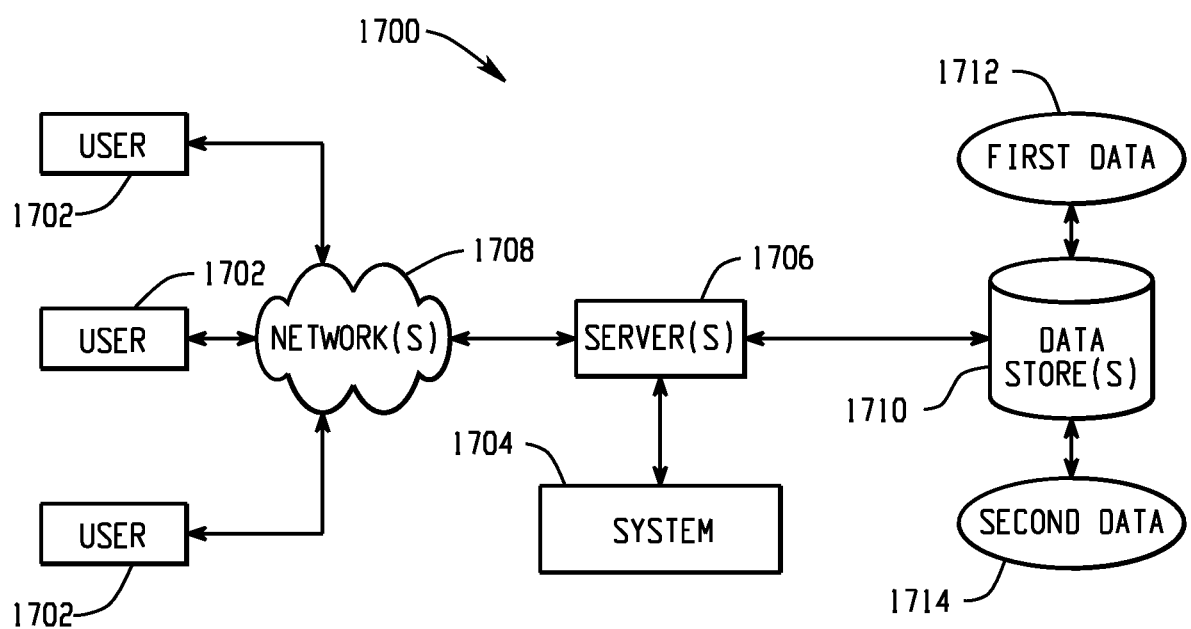
FIGS. 17, 18A, 18B and 18C depict example systems that may be used to implement the technology disclosed herein.

FIG. 17 depicts at 1700 a computer-implemented environment wherein users 1702 can interact with a system 1704 hosted on one or more servers 1706 through a network 1708. The system 1704 contains software operations or routines. The users 1702 can interact with the system 1704 through a number of ways, such as over one or more networks 1708. One or more servers 1706 accessible through the network(s)

1708 can host system 1704. It should be understood that the system 1704 could also be provided on a stand-alone computer for access by a user.

Figure 18A:
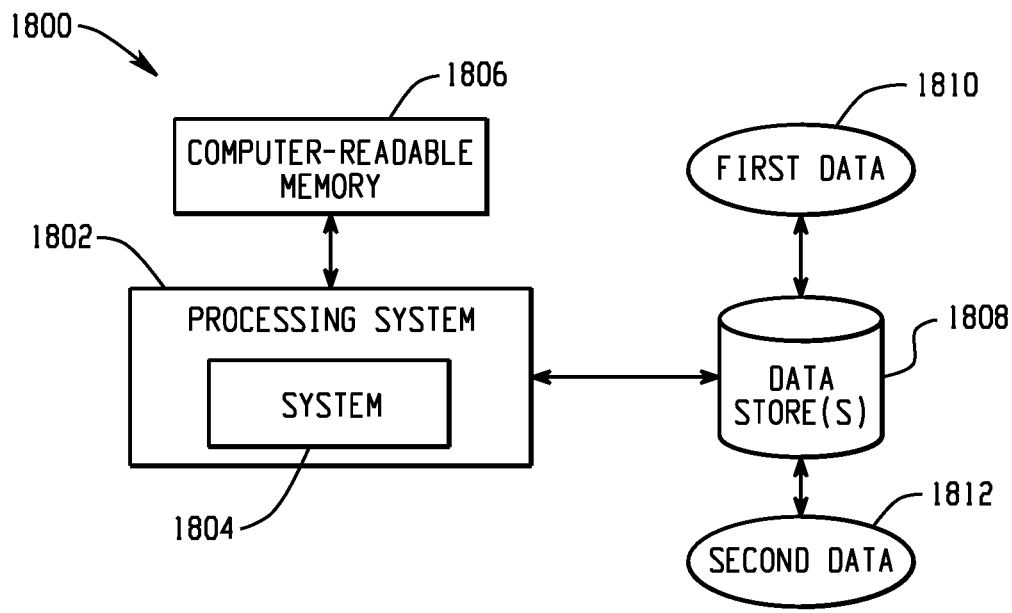
Figure 18B:
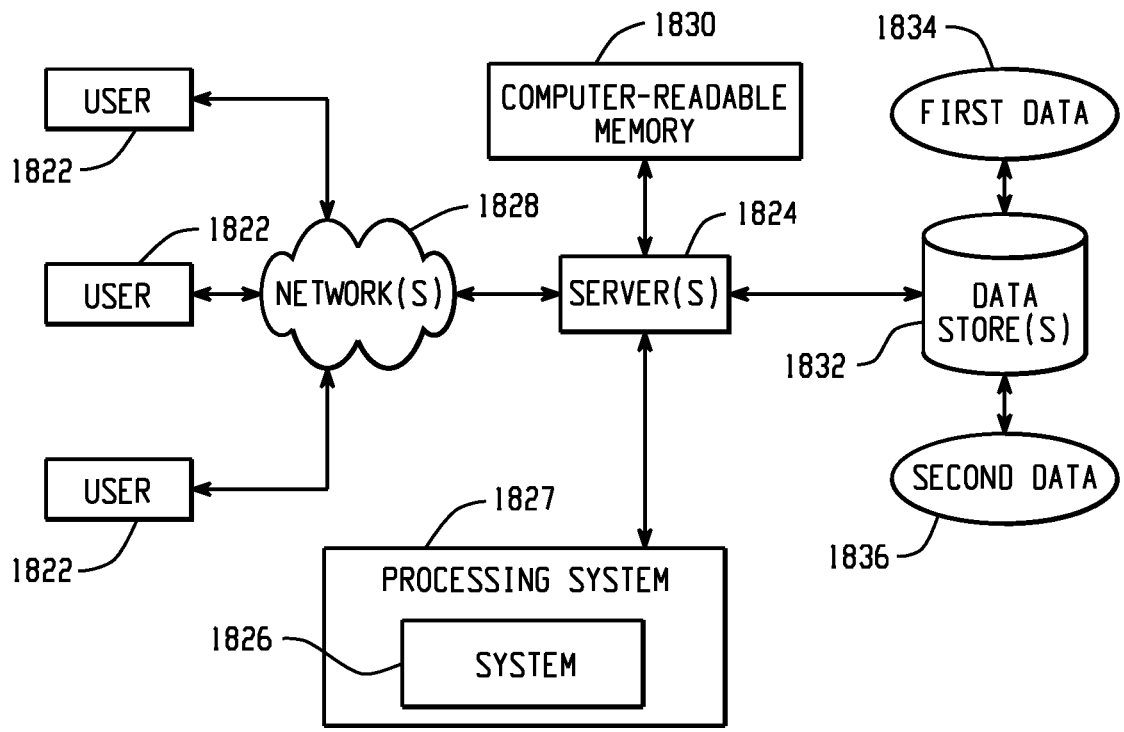
Figure 18C:
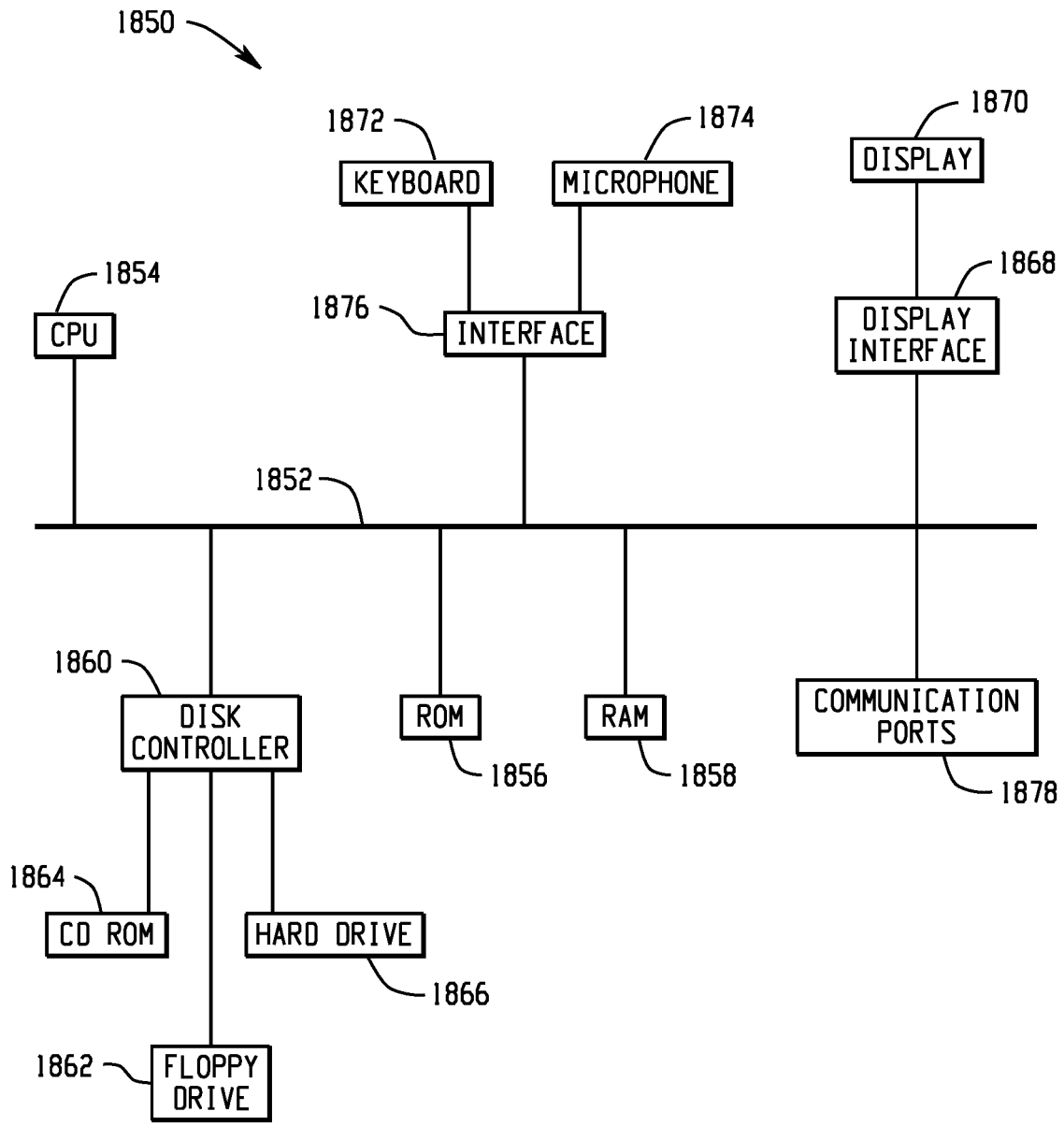

FIGS. 18A, 18B, and 18C depict example systems for use in implementing a system. For example, FIG. 18A depicts an exemplary system 1800 that includes a standalone computer architecture where a processing system 1802 (e.g., one or more computer processors) includes a system 1804 being executed on it. The processing system 1802 has access to a non-transitory computer-readable memory 1806 in addition to one or more data stores 1808. The one or more data stores 1808 may contain first data 1810 as well as second data 1812.

FIG. 18B depicts a system 1820 that includes a client server architecture. One or more user PCs 1822 accesses one or more servers 1824 running a system 1826 on a processing system 1827 via one or more networks 1828. The one or more servers 1824 may access a non-transitory computer readable memory 1830 as well as one or more data stores 1832. The one or more data stores 1832 may contain first data 1834 as well as second data 1836.

FIG. 18C shows a block diagram of exemplary hardware for a standalone computer architecture 1850, such as the architecture depicted in FIG. 18A, that may be used to contain and/or implement the program instructions of system embodiments of the present disclosure. A bus 1852 may serve as the information highway interconnecting the other illustrated components of the hardware. A processing system 1854 labeled CPU (central processing unit) (e.g., one or more computer processors), may perform calculations and logic operations required to execute a program. A non-transitory computer-readable storage medium, such as read only memory (ROM) 1856 and random access memory (RAM) 1858, may be in communication with the processing system 1854 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 1860 interfaces one or more disk drives to the system bus 1852. These disk drives may be external or internal floppy disk drives such as 1862, external or internal CD-ROM, CD-R, CD-RW or DVD drives such as 1864, or external or internal hard drives 1866.

Each of the element managers, real-time data buffer, conveyors, file input processor, database index shared access memory loader, reference data buffer and data managers may include a software application stored in one or more of the disk drives connected to the disk controller 1860, the ROM 1856 and/or the RAM 1858. Preferably, the processor 1854 may access each component as required.

A display interface 1868 may permit information from the bus 1856 to be displayed on a display 1870 in audio, graphic, or alphanumeric format. Communication with external devices may occur using various communication ports 1878.

In addition to the standard computer-type components, the hardware may also include data input devices, such as a keyboard 1872, or other input device 1874, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A method for performing a SPICE-based timing analysis on a circuit design, comprising:
   identifying a plurality of switching scenarios for the circuit design, wherein a switching scenario comprises a switching behavior for timing paths of the circuit design based on one or more input vectors;
   applying one or more predictive models to predict a subset of the plurality of switching scenarios that are likely to cause timing paths with critical timing problems, wherein a plurality of timing paths in the circuit design are ranked based on a predicted criteria indicative of timing paths that are likely to have critical timing problems, wherein the plurality of switching scenarios are ranked based on the ranking of the plurality of timing paths, and wherein the subset predicted based on a default supply voltage for a particular timing path;
   performing a dynamic voltage analysis on timing paths based on the subset of switching scenarios to determine a revised voltage for the particular timing path;
   applying the one or more predictive models to predict a set of critical timing paths based on the subset of switching scenarios that are likely to cause critical timing problems, the set of critical timing paths including the particular timing path, the set of critical timing paths predicted based on the revised voltage; and
   performing the SPICE-based timing analysis on the set of critical timing paths.

2. The method of claim 1, wherein the critical timing problems include a negative slack.

3. The method of claim 1, wherein the critical timing problems include a hold time violation.

4. The method of claim 1, further comprising:
   modifying the circuit design based on the SPICE-based timing analysis to correct the critical timing problems.

5. The method of claim 1, further comprising:
   training one or more predictive models using customer-specific circuit data.

6. The method of claim 1, wherein a full timing analysis is performed for the SPICE-based timing analysis.

7. The method of claim 1, wherein the set of critical timing paths are timing paths that are determined from static timing analysis to have less than a predetermined threshold amount of slack.

8. The method of claim 1, wherein applying one or more predictive models to predict a subset of the plurality of switching scenarios that are likely to cause timing paths with critical timing problems comprises:
   ranking the plurality of timing paths in the circuit design based on the predicted criteria indicative of timing paths that are likely to have critical timing problems;
   applying weighting factors to the plurality of timing paths based on the ranking of the plurality of timing paths;
   ranking the plurality of switching scenarios based on the weighting factors applied to the plurality of timing paths; and
   selecting the subset of the plurality of switching scenarios based on the ranking of the plurality of switching scenarios.

9. The method of claim 8, wherein the predicted criteria is a predicted delta slack or a predicted hold time violation.

10. A computer-implemented system for performing a SPICE-based timing analysis on a circuit design, comprising:
  one or more data processors;
  one or more computer-readable storage mediums encoded with instructions which when executed cause the one or more data processors to perform steps that include:
    identifying a plurality of switching scenarios for the circuit design, wherein a switching scenario comprises a switching behavior for timing paths of the circuit design based on one or more input vectors;
    applying one or more predictive models to predict a subset of the plurality of switching scenarios that are likely to cause timing paths with critical timing problems, wherein a plurality of timing paths in the circuit design are ranked based on a predicted criteria indicative of timing paths that are likely to have critical timing problems, wherein the plurality of switching scenarios are ranked based on the ranking of the plurality of timing paths, and wherein the subset predicted based on a default supply voltage for a particular timing path;
    performing a dynamic voltage analysis on timing paths based on the subset of switching scenarios to determine a revised voltage for the particular timing path;
    applying the one or more predictive models to predict a set of critical timing paths based on the subset of switching scenarios that are likely to cause critical timing problems, the set of critical timing paths including the particular timing path, the set of critical timing paths predicted based on the revised voltage; and
    performing the SPICE-based timing analysis on the set of critical timing paths.

11. The computer-implemented system of claim 10, wherein the critical timing problems include a negative slack.

12. The computer-implemented system of claim 10, wherein the critical timing problems include a hold time violation.

13. The computer-implemented system of claim 10, wherein the one or more computer-readable storage mediums are encoded with instructions for which when executed cause the one or more data processors to perform steps that further include:
  modifying the circuit design based on the SPICE-based timing analysis to correct the critical timing problems.

14. The computer-implemented system of claim 10, wherein the one or more computer-readable storage mediums are encoded with instructions for which when executed cause the one or more data processors to perform steps that further include:
  training one or more predictive models using customer-specific circuit data.

15. The computer-implemented system of claim 10, wherein a full timing analysis is performed for the SPICE-based timing analysis.

16. The computer-implemented system of claim 10, wherein the set of critical timing paths are timing paths that are determined from static timing analysis to have less than a predetermined threshold amount of slack.

17. The computer-implemented system of claim 10, wherein applying one or more predictive models to predict a subset of the plurality of switching scenarios that are likely to cause timing paths with critical timing problems comprises:
  ranking the plurality of timing paths in the circuit design based on the predicted criteria indicative of timing paths that are likely to have critical timing problems;
  applying weighting factors to the plurality of timing paths based on the ranking of the plurality of timing paths;
  ranking the plurality of switching scenarios based on the weighting factors applied to the plurality of timing paths; and
  selecting the subset of the plurality of switching scenarios based on the ranking of the plurality of switching scenarios.

18. The computer-implemented system of claim 17, wherein the predicted criteria is a predicted delta slack or a predicted hold time violation.

19. A non-transitory computer-readable storage medium comprising instructions which when executed cause a processing system to execute steps comprising:
  identifying a plurality of switching scenarios for a circuit design, wherein a switching scenario comprises a switching behavior for timing paths of the circuit design based on one or more input vectors;
  applying one or more predictive models to predict a subset of the plurality of switching scenarios that are likely to cause timing paths with critical timing problems, wherein a plurality of timing paths in the circuit design are ranked based on a predicted criteria indicative of timing paths that are likely to have critical timing problems, wherein the plurality of switching scenarios are ranked based on the ranking of the plurality of timing paths, and wherein the subset predicted based on a default supply voltage for a particular timing path;
  performing a dynamic voltage analysis on timing paths based on the subset of switching scenarios to determine a revised voltage for the particular timing path;
  applying the one or more predictive models to predict a set of critical timing paths based on the subset of switching scenarios that are likely to cause critical timing problems, the set of critical timing paths including the particular timing path, the set of critical timing paths predicted based on the revised voltage; and
  performing a SPICE-based timing analysis on the set of critical timing paths.

20. The non-transitory computer-readable storage medium of claim 19, wherein the critical timing problems include a negative slack.

21. The non-transitory computer-readable storage medium of claim 19, wherein the critical timing problems include a hold time violation.

22. The non-transitory computer-readable storage medium of claim 19, further comprising:
  modifying the circuit design based on the SPICE-based timing analysis to correct the critical timing problems.

23. The non-transitory computer-readable storage medium of claim 19, further comprising:
  training one or more predictive models using customer-specific circuit data.

24. The non-transitory computer-readable storage medium of claim 19, wherein a full timing analysis is performed for the SPICE-based timing analysis.

25. The non-transitory computer-readable storage medium of claim 19, wherein applying one or more predictive models to predict a subset of the plurality of switching scenarios that are likely to cause timing paths with critical timing problems comprises:

ranking the plurality of timing paths in the circuit design based on the predicted criteria indicative of timing paths that are likely to have critical timing problems;

applying weighting factors to the plurality of timing paths based on the ranking of the plurality of timing paths;

ranking the plurality of switching scenarios based on the weighting factors applied to the plurality of timing paths; and selecting the subset of the plurality of switching scenarios based on the ranking of the plurality of switching scenarios.

26. The non-transitory computer-readable storage medium of claim 25, wherein the predicted criteria is a predicted delta slack or a predicted hold time violation.

\* \* \* \* \*